Patented July 11, 1933

1,917,713

UNITED STATES PATENT OFFICE

RICHARD HESSEN, OF BAUTZEN, GERMANY

PREPARATION OF RESITOLS

No Drawing. Application filed April 24, 1930, Serial No. 447,089, and in Germany February 7, 1930.

It is known that the soluble and fusible initial condensation products, so-called resoles, formed during the phenol-formaldehyde condensation, before being converted by heating into the insoluble and infusible final condensation products, so-called resites, first pass for some time through an intermediate stage, wherein the so-called resitols exist. (Vide M. Lebach Chem. Ztg. 1913, 734).

It is further also known to convert this resitol, after imparting the final shape to the same, by means of heat into resite.

All the known processes relate to heating the resoles, if desired under pressure, until resitol is formed. The free phenols and water always present in the resoles, as well as the water of condensation formed on heating the resoles, are either not removed at all or only partially removed during this conversion and remain enclosed in the resitol formed, since only relatively low temperatures, such as about 100° C., can be employed and moreover the resitol layer first formed on the surface prevents the water and the remaining volatile constituents from escaping from the interior of the resin. These impurities, however, as is known considerably influence the quality of the end products, for example, the mechanical solidity, elasticity, resistance to heat, durability, electrical resistance, etc.

According to this invention it has been found that resitols, free from phenols, water and volatile bases, which are capable of being satisfactorily worked up and have exceptional properties, can be obtained by heating, preferably repeatedly heating, soluble and fusible initial phenol-aldehyde condensation products in thin layers for a short time to elevated temperatures and thereby partially converting the same into resites. This treatment is continued until all or the greater portion of the volatile constituents are removed and the resitol formed still contains the proportion of the resole desired for the further working up of the resulting resitol. Resoles are suitable as starting materials. Condensation accelerators, such as hexamethylene-tetramine, formaldehyde, or polymers or homologues of formaldehyde may also be successfully employed. Phenol-aldehyde condensation products capable of being converted into resoles are also suitable as starting material in the presence of the substances necessary for the resole formation. The boiling temperatures of the phenols are recommended as suitable temperatures for the process.

In this way at least the greater part of the volatile constituents may be removed. It is advisable to lower the temperature rapidly after the heating process or after each heating process so that the desired resitol phase still remains. This conversion process is continued so long as the resitol formed can still be satisfactorily and readily shaped and be converted in known manner into the resite phase. The duration of the treatment and the number of times it is repeated depend on the temperature employed, the nature and reactivity of the starting material and the thickness of the layer.

The process according to this invention may, for example, be carried into effect as follows:

A solid or viscous initial condensation product, for example, resole, is brought on to a plate heated to about 100° to 200° C. and rolled out into a thin layer by means of a roller heated to about the same temperature. The thickness of the said layer depends upon the desired quality of the end product as well as on the temperature employed and must be varied according to the nature and reactivity of the starting materials. In general the thinner the layer, the better the end product will be. The roller and also the plate are provided with closely fitting sharp knives so that the layer of resin can be easily removed after heating. The operation is repeated until the product becomes elastic and gummy on heating and until substantially no more vapors are given off and the cooled product can still be satisfactorily shaped by the application of heat and pressure. The course and the stage of the reaction can also with great advantage be controlled by the degree of solubility of the resitol formed, it having been found, contrary to all observations made hitherto, that with the most finely powdered resitols a considerable portion of the resitol is soluble both in absolute alcohol and also in acetone and phenol. Thus, if a resitol is finely powdered and extracted with acetone or absolute alcohol, the resole is removed from the resitol and the resite remains behind. This fact is very important for the process according to this invention, since the possibility of satisfactorily working up or compressing the product depends upon the content of resole remaining in the resitol.

In order to shape or compress resitols with a low content of resoles, higher temperatures and a higher pressure are necessary than for compressing resitols containing a greater amount of resoles.

The process can also be carried out with the aid of heated calenders or mixing rollers. Paraform or hexamethylenetetramine may also be added to the resoles employed in order to accelerate the formation of resitol, alternatively Novalaks may be employed and the same be converted into resoles by the action of hexamethylenetetramine, etc., before or during the process. Substances, which do not detrimentally influence the good qualities of the end products, may also be added to the starting materials.

The following example serves to illustrate how the invention may be carried into effect:

10 kgms of a resole are heated on a mixing roller, the rollers of which are heated to 150° to 180° C., rolled out into a thin layer of about 0.5 mm, the resinous layer subjected for about 15 to 30 seconds to the temperature mentioned above, then rapidly removed from the roller, if necessary cooled in a cold current of air, then again brought on to the roller and the operation repeated until a sample of the resitol in a powdered condition still yields, on extraction with alcohol, about 20 to 25% of soluble and fusible constituents, i. e. resoles, and can be satisfactorily shaped by the application of heat and pressure.

What I claim is:—

1. A process for preparing a plastic mixture containing resitols, comprising distributing in a thin layer a soluble and fusible initial phenol-aldehyde conversion product including resole, heating the layer to a temperature above the evaporating point of the undesired volatile constituents and above the hardening temperature of the resole for a time sufficient for elimination of the volatilized constituents and for the conversion of the resole to resitol, and discontinuing the heating prior to the conversion of all the resole to resite.

2. A process as in claim 1 including the further steps of cooling the layer, again heating the material while distributed in a thin layer to a temperature above the evaporation point of the undesired volatile constituents and above the hardening temperature of the resole for a time sufficient to drive off a further quantity of volatilized constituents and to convert a further portion of the resole to resite, and then discontinuing the heating prior to the conversion of all the resole to resite.

3. A process of preparing a plastic mixture containing resitols comprising mixing a soluble and fusible initial condensation product including a resole which is not hardened by simple heating, with a hardening agent including a compound containing the methylene group, distributing the mixture in a thin layer, heating the said layer to a temperature above the evaporation point of the undesirable volatile constituents whereby to provoke a reaction between said hardening agent and the resole, continuing said heating for a time sufficient for elimination of the volatilized constituents and for the conversion of the resole to resite, and discontinuing the heating prior to the conversion of all the resole to resite.

4. A process for preparing a plastic mixture containing resitols, comprising distributing in a thin layer a soluble and fusible initial phenol-aldehyde product including a resole, heating the layer to a temperature above the evaporating point of undesired volatile constituents and above the hardening temperature of the resole for a time sufficient for substantial elimination of the volatilized constituents and for the conversion of the resole to resitol, removing the resitol from the action of heat, and rapidly cooling it to below said hardening temperature.

In testimony whereof I have signed my name to this specification.

RICHARD HESSEN.